(12) United States Patent
Sawhney et al.

(10) Patent No.: US 11,084,704 B2
(45) Date of Patent: *Aug. 10, 2021

(54) DISPENSER CONTROL ARCHITECTURE

(71) Applicant: The Coca-Cola Company, Atlanta, GA (US)

(72) Inventors: Davinder Sawhney, Atlanta, GA (US); Christopher Paul Snowden, Atlanta, GA (US)

(73) Assignee: The Coca-Cola Company, Atlanta, GA (US)

(*) Notice: Subject to any disclaimer, the term of this patent is extended or adjusted under 35 U.S.C. 154(b) by 82 days.

This patent is subject to a terminal disclaimer.

(21) Appl. No.: 16/450,613

(22) Filed: Jun. 24, 2019

(65) Prior Publication Data

US 2019/0308866 A1    Oct. 10, 2019

Related U.S. Application Data

(63) Continuation of application No. 15/109,876, filed as application No. PCT/US2015/010166 on Jan. 5, 2015, now Pat. No. 10,358,334.

(Continued)

(51) Int. Cl.
| | |
|---|---|
| *G05B 15/00* | (2006.01) |
| *B67D 1/08* | (2006.01) |
| *G07F 9/02* | (2006.01) |
| *G07F 13/06* | (2006.01) |
| *G06Q 30/06* | (2012.01) |

(Continued)

(52) U.S. Cl.
CPC ......... *B67D 1/0888* (2013.01); *B67D 1/0035* (2013.01); *B67D 1/10* (2013.01); *B67D 1/1284* (2013.01); *G05B 15/02* (2013.01); *G06F 3/0482* (2013.01); *G06F 3/0484* (2013.01);

(Continued)

(58) Field of Classification Search
None
See application file for complete search history.

(56) References Cited

U.S. PATENT DOCUMENTS

| | | | |
|---|---|---|---|
| 10,358,334 B2* | 7/2019 | Sawhney | ............... G07F 13/06 |
| 2006/0079993 A1 | 4/2006 | Warn et al. | |

(Continued)

FOREIGN PATENT DOCUMENTS

| | | |
|---|---|---|
| EP | 1321908 A2 | 6/2003 |
| KR | 20110100643 A | 9/2011 |

(Continued)

OTHER PUBLICATIONS

Meijs, Koen; European Office Action; dated Apr. 30, 2019; pp. 1-8; European Patent Office; The Hague, Netherlands.

(Continued)

*Primary Examiner* — Paul B Yanchus, III

(57) ABSTRACT

A control architecture for use with beverage product dispensers is provided. Instructions may be received at an interface module for performing one or more requested dispenser operations. The interface module may send the instructions to a dispense module. The dispense module may translate the instructions to predetermined commands associated with a dispenser. The one or more requested dispenser operations may then be performed based on the predetermined commands from the translated instructions.

20 Claims, 9 Drawing Sheets

Related U.S. Application Data

(60) Provisional application No. 61/987,020, filed on May 1, 2014, provisional application No. 61/923,975, filed on Jan. 6, 2014.

(51) Int. Cl.

| | | |
|---|---|---|
| *B67D 1/00* | (2006.01) | |
| *B67D 1/10* | (2006.01) | |
| *B67D 1/12* | (2006.01) | |
| *G05B 15/02* | (2006.01) | |
| *G06F 3/0482* | (2013.01) | |
| *G06F 3/0484* | (2013.01) | |
| *G06F 3/0488* | (2013.01) | |

(52) U.S. Cl.
CPC ........... *G06F 3/0488* (2013.01); *G06Q 30/06* (2013.01); *G07F 9/02* (2013.01); *G07F 13/06* (2013.01)

(56) References Cited

U.S. PATENT DOCUMENTS

| | | |
|---|---|---|
| 2009/0105875 A1 | 4/2009 | Wiles |
| 2009/0129403 A1 | 5/2009 | Harrell et al. |
| 2009/0293733 A1 | 12/2009 | Martin et al. |
| 2010/0198643 A1 | 8/2010 | Friedman et al. |
| 2012/0035761 A1 | 2/2012 | Tilton et al. |
| 2013/0096715 A1 | 4/2013 | Chung et al. |
| 2014/0114469 A1* | 4/2014 | Givens ................ B67D 1/0041 700/232 |

FOREIGN PATENT DOCUMENTS

| | | |
|---|---|---|
| WO | 0143088 A1 | 6/2001 |
| WO | 2011163670 A2 | 12/2011 |

OTHER PUBLICATIONS

Bayer Mitrovic; Examination report No. 1; dated Sep. 2, 2019; pp. 1-3; IP Australia; Woden, Australia.

\* cited by examiner

DISPENSER CONTROL ARCHITECTURE

This application is a continuation of U.S. patent application Ser. No. 15/109,876, filed Jul. 6, 2016, which is a continuation of U.S. National stage application of International Application PCT/US2015/010166, filed on 5 Jan. 2015, which claims the benefit of priority to U.S. Provisional Patent Application Ser. No. 61/923,975, filed Jan. 6, 2014, and U.S. Provisional Patent Application Ser. No. 61/987,020, filed May 1, 2014, the entirety of each of which are incorporated herein by reference.

BACKGROUND

Modern dispensers utilize a combination of hardware and software to provide new or enhanced functionality such as custom beverage mixes and user interface displays associated with products or product promotions. For example, a dispenser may be customized through the receiving of a software update by a customer from a dispenser manufacturer which provides various recipes for mixing certain beverages utilizing dispenser equipment (e.g., pumps) and stored ingredients. Dispenser customization may be hindered however, across disparate dispenser platforms. In particular, a dispenser family may include small, medium and large dispensers, with each having different hardware and software requirements. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for a control architecture for use with beverage product dispensers. Instructions may be received at an interface module for performing one or more requested dispenser operations. The interface module may send the instructions to a dispense module. The dispense module may translate the instructions to predetermined commands associated with a dispenser. The one or more requested dispenser operations may then be performed based on the predetermined commands from the translated instructions.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Figure 1:
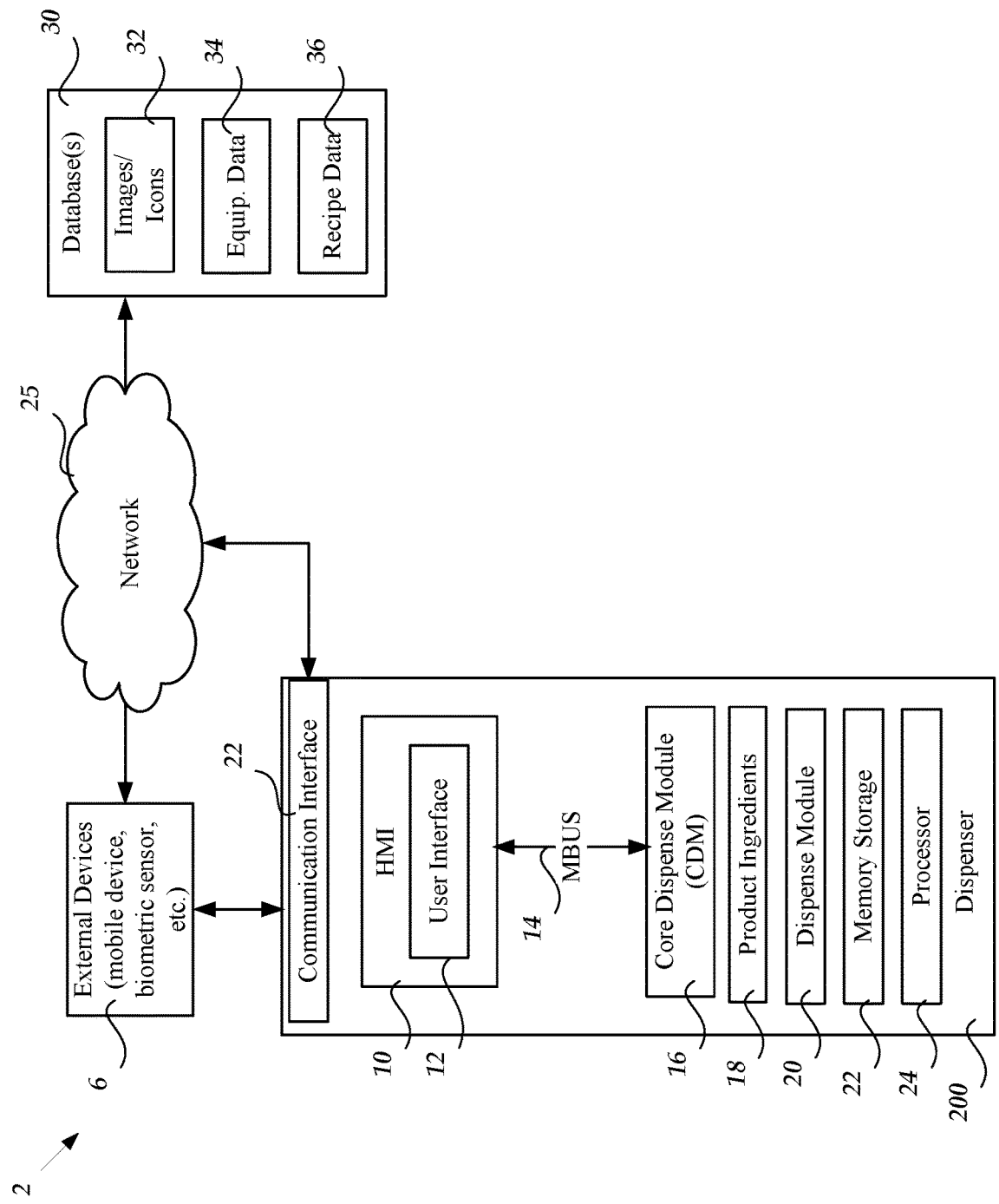
FIG. 1 is a block diagram illustrating a network architecture for a dispenser implementing a dispenser control architecture, in accordance with an embodiment.

Embodiments are provided for a control architecture for use with beverage product dispensers. Instructions may be received at an interface module for performing one or more requested dispenser operations. The interface module may send the instructions to a dispense module. The dispense module may translate the instructions to predetermined commands associated with a dispenser. The one or more requested dispenser operations may then be performed based on the predetermined commands from the translated instructions.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

It should be understood that "beverage," as used herein, includes, but is not limited to, pulp and pulp-free citrus and non-citrus fruit juices, fruit drinks, vegetable juice, vegetable drink, milk, soy milk, protein drink, soy-enhanced drink, tea, water, isotonic drink, vitamin-enhanced water, soft drink, flavored water, energy drink, coffee, smoothies, yogurt drinks, hot chocolate and combination thereof. The beverage may also be carbonated or non-carbonated. The beverage may comprise beverage components (e.g., beverage bases, colorants, flavorants, and additives.)

The term "beverage base" refers to parts of the beverage or the beverage itself prior to additional colorants, additional flavorants, and/or additional additives. According to certain embodiments of the present invention, beverage bases may include, but are not limited to syrups, concentrates, and the like that may be mixed with a diluent such as still or carbonated water or other diluent to form a beverage. The beverage bases may have reconstitution ratios of about 3:1 to about 6:1 or higher but generally less than 10:1. According to certain embodiments, beverage bases may comprise a mixture of beverage base components.

The term "beverage base component" refers to components which may be included in beverage bases. According to certain embodiments of the present invention, the beverage base component may comprise parts of beverages which may be considered food items by themselves. According to certain embodiments of the present invention, the beverage base components may be micro-ingredients such as an acid portion of a beverage base, an acid-degradable and/or non-acid portion of a beverage base, natural and artificial flavors, flavor additives, natural and artificial flavors, nutritive or non-nutritive natural or artificial sweeteners, additives for controlling tartness (e.g., citric acid or potassium citrate), functional additives such as vitamins, minerals, or herbal extracts, nutraceuticals, or medicaments. The micro-ingredients may have reconstitution ratios from about 10:1, 20:1, 30:1, or higher with many having reconstitution ratios of 50:1 to 300:1. The viscosities of the micro-ingredients may range from about 1 to about 100 centipoise.

Thus, for the purposes of requesting, selecting, or dispensing a beverage base, a beverage base formed from separately stored beverage base components may be equivalent to a separately stored beverage base. For the purposes of requesting, selecting or dispensing a beverage, a beverage formed from separately stored beverage components may be equivalent to a separately stored beverage.

By "separately stored" it is meant that the components of the present invention are kept separate until combined. For instance, the components may be separately stored individually in each container or may be all stored in one container wherein each component is individually packaged (e.g., plastic bags) so that they do not blend while in the container. In some embodiments, the container, itself, may be individual, adjacent to, or attached to another container.

The term "blended beverage" includes final products wherein two or more beverages have been blended or mixed or otherwise combined to form a final product.

Referring now to the drawings, in which like numerals represent like elements through the several figures, various aspects of the present invention will be described. FIG. 1 is a block diagram illustrating a network architecture 2 for a dispenser 200 implementing a dispenser control architecture, in accordance with an embodiment. The network architecture 2 includes the dispenser 200 that may be in communication with external devices 6 and one or more databases 30 over a network 25. The network 25 may include a local or wide area network (e.g., the Internet). In some embodiments, the communication between the dispenser 200 the external devices 6 and the databases 30 may be accomplished utilizing any number of communication techniques known to those skilled in the art including, but not limited to, BLUETOOTH wireless technology, Wi-Fi, Universal Serial Bus (USB) and other wireless or wireline communication standards or technologies, via communication interface 22. In an embodiment, the dispenser 200 may be configured to store and dispense (i.e., pour) various product ingredients 18 through a dispense module 20. The dispense module 20 may comprise a number of pumps, nozzles, valves, carbonation systems, ice handling systems, and other fluid handling systems for dispensing a beverage product. The product ingredients 18 may include beverage bases or beverage base components (e.g., concentrated syrups) as well as flavors (i.e., flavoring agents, flavor concentrates, or flavor syrups), which may be separately stored or otherwise contained in individual removable containers (not shown). In accordance with an embodiment, each of the beverage bases or beverage base components and each of the flavors may be separately stored or otherwise contained in individual removable cartridges that are stored in the dispenser 200. The dispenser 200 may automatically identify the cartridges upon installation by a user or the user may be prompted to identify the cartridges when they are installed. It should be appreciated that the aforementioned beverage components (i.e., beverage bases or beverage base components and flavors) may be combined, along with other beverage ingredients, to dispense various products that may include beverages or blended beverages (i.e., finished beverage products) from the dispenser 200. It should be understood however, that the dispenser 200 may also be configured to dispense beverage components individually. In some embodiments, the dispenser 200 may be configured to dispense beverage base components so as to form a beverage base or finished beverage. The other beverage ingredients may include diluents such as still or carbonated water, functional additives, or medicaments, for example. The other beverage ingredients 4 may be installed in the dispenser 200, pumped to the dispenser 200, or both. Carbonated water may be also produced in the dispenser 200 through the mixing of $CO_2$ and still water such as in a carbonator or other device that produces carbonated water (not shown).

The dispenser 200 may further include a dispenser control architecture comprising a human machine interface (HMI) module 10 (hereinafter, HMI 10), a machine bus (MBUS) 14 and a core dispense module (CDM) 16. The MBUS 14 facilitates communication between the HMI 10 and the CDM 16. As will be described in greater detail herein, the HMI 10, MBS 14 and CDM 16 may collectively comprise common core components, implemented as hardware or as combination of hardware and software, that may be adapted to provide customized functionality in the dispenser 200. The dispenser 200 may further include memory storage 22 and a processor 24.

It should be understood that the common core components in the dispenser control architecture described herein may be utilized across a number of dispenser types/platforms, each having different equipment requirements. For example, the common core components may be utilized in a family of dispensers comprising a small beverage dispenser (e.g., for use in a home or small office setting) consisting of a limited number of beverage pumps and associated equipment (e.g., nozzles, etc.), a medium sized beverage dispenser (e.g., for use in a commercial setting) consisting of a larger number of beverage pumps and associated equipment, and a large beverage dispenser (e.g., for use in a large commercial or industrial setting) consisting of an even larger number of beverage pumps and associated equipment. In some embodiments, the pumps in each of the different dispensers in a family of dispensers may be different types or sizes of pumps. The HMI 10 and the CDM 16 may be customized through the use of adapters (e.g., configuration files comprising application programming interfaces (APIs)) to provide customized user interface views and equipment behavior for the dispenser 200.

In some embodiments, a user interface 12 in the dispenser 200 may be utilized to select and individually dispense one or more beverages. The beverages may be dispensed as beverage components in a continuous pour operation whereby one or more selected beverage components continue to be dispensed while a pour input is actuated by a user or in a batch pour operation whereby a predetermined volume of one or more selected beverage components are dispensed (e.g., one ounce at a time). The user interface 12 may be addressed via a number of methods to select and dispense beverages. For example, a user may interact with the user interface 12 via touch input to navigate one or more menus from which to select and dispense a beverage. As another example, a user may type in a code using an onscreen or physical keyboard (not shown) on the dispenser 200 to navigate one or more menus from which to select and dispense a beverage. As yet another example, a user may use the mobile computing device 6 to scan a one or two-dimensional barcode (e.g., a QR code) or other symbol shown on a tag or sticker affixed to, printed on the dispenser 200 or displayed on a display of the dispenser 200 to select a beverage for dispensing. As yet another example, a user may use the mobile computing device 6 to communicate desired beverage selections tO the dispenser 200 and initiate a beverage to be poured.

The databases 30 may comprise one or more backend databases which are utilized to store data that may be utilized in conjunction with customized dispenser functionality provided by the dispenser control architecture described herein. For example, the databases 30 may include graphics such as images/icons 32 for customizing the user interface 12, equipment data 34 for customizing dispenser equipment behavior (such as configuring pumps for pouring varying amounts of a beverage) and recipe data 36 for providing instructions to the dispenser 200 for creating beverages and finished beverage products.

The external devices 6 may include, without limitation, a smartphone, a tablet personal computer, a laptop computer, biometric sensors and the like. In some embodiments, the external devices 6 may be utilized to receive user interface views from the HMI 10 that may be in lieu of or in addition to user interface views displayed in the user interface 12 of the dispenser 200. For example, in some embodiments, the dispenser 200 may be configured for "headless" operation in which graphics and other user interface elements are displayed on a customer's smartphone instead of on the dispenser 200.

It should be understood that the HMI 10 and the CDM 16 may be configured to execute independent processes with respect to each other in the dispenser 200. For example, in some embodiments, the HMI 10 may perform one or more external network processes (such as backend communication with the databases 30) as well as display screen navigation and other processes that do not require communication with the CDM 16. Similarly, in some embodiments, the CDM 16 may perform both automated and event-based processing tasks that do not require communication with the HMI 10. For example, automated processing tasks may include the periodic agitation of ingredients utilized in dispensing a beverage from the dispenser 200. Event-based processing tasks may include the starting and stopping of dispenser agitation and/or pumping operations based on monitored events (e.g., the opening of a dispenser door, ingredient cartridge removal/insertion, ingredient sold out status, etc.). Illustrative processes performed by the HMI 10 and the CDM 16 will be described in greater detail below with respect to FIGS. 2 and 8-10.

Figure 2:
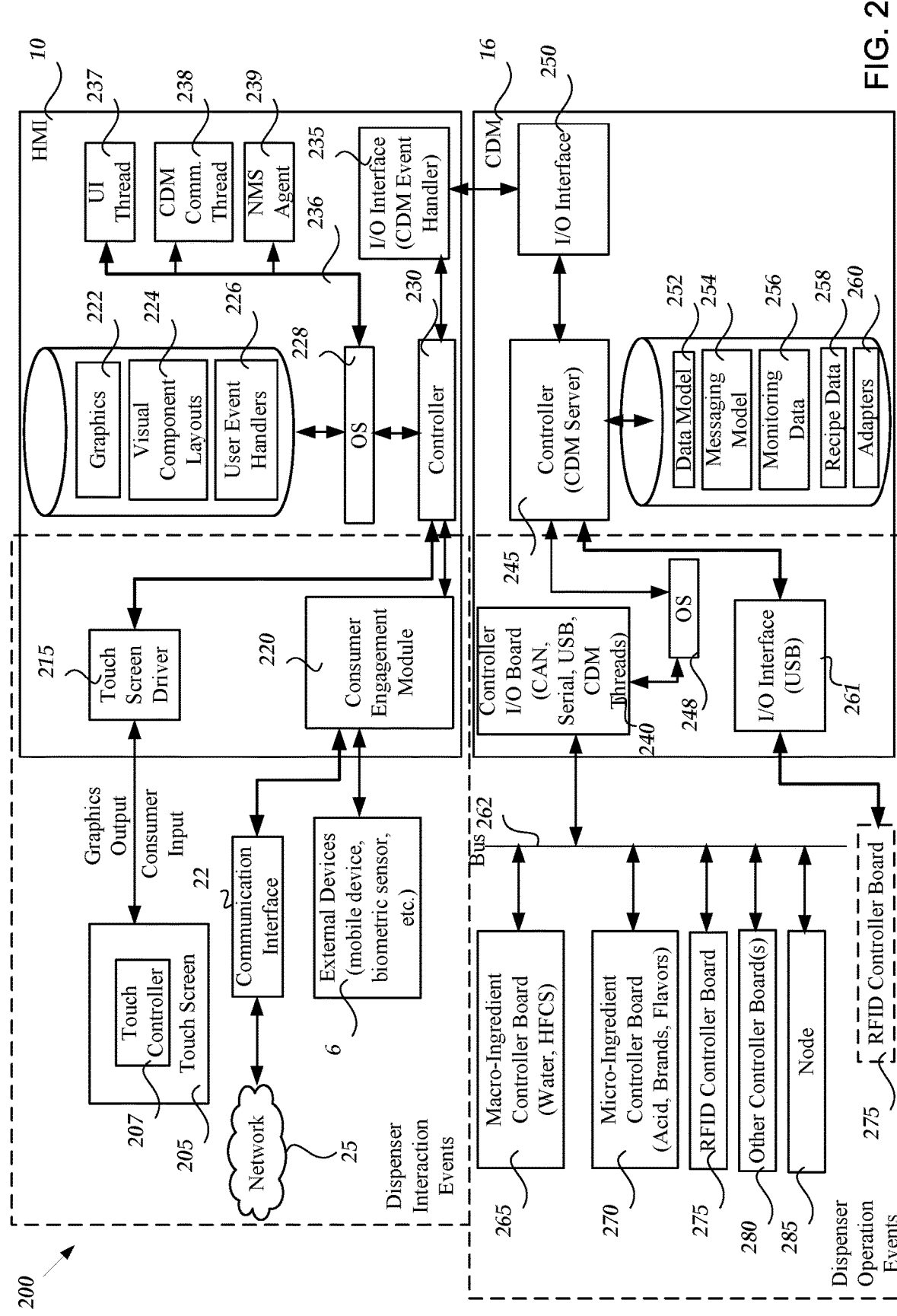
FIG. 2 is a block diagram illustrating various components of a dispenser that may include the dispenser control architecture of FIG. 1, in accordance with an embodiment.

FIG. 2 is a block diagram illustrating various components of a dispenser 200 that may include the dispenser control architecture described with respect to FIG. 1, in accordance with an embodiment. As will be described in greater detail below, the dispenser 200 may be configured to perform dispenser interaction events (which are handled either independently by the HMI 10 or in conjunction with the CDM 16) and dispenser operation events (which are handled either independently by the CDM 16 or in conjunction with the HMI 10). The dispenser 200 may include a touch screen 205, the communication interface 22, the HMI 10, the CDM 16, a communications bus 262, macro-ingredient controller board 265, micro-ingredient controller board 270, RFID controller board 275, other controller boards 280 and node 285.

The touch screen 205, which may comprise a touch controller 207, may be configured to receive various commands from a user (i.e., consumer input) in the form of touch input, generate a graphics output (e.g., touch screen coordinates) and/or execute one or more operations with the dispense module 20 (via the HMI 10 and/or the CDM 16), in response to receiving the aforementioned commands.

The HMI 10 may include a touch screen driver 215, a consumer engagement module 220, stored graphics 222, stored visual component layouts 224, stored user event handlers 226, an operating system 228, a controller 230 and an input/output interface 235. The touch screen driver 215 may be configured to receive the consumer or customer inputs and generate events (e.g., touch screen events) that may then be communicated through controller 230 to the operating system 228. For example, the touch screen events may indicate coordinates on the touch screen 205 where a received touch input is detected. The operating system 228 is also in communication with a number of threads that may include user interface thread 237, CDM communications thread 238 and Network Management System (NMS) agent thread 239. In an embodiment, the operating system 228 may call the threads 237-239 to execute various processes, which may include graphics rendering and communication operations, in the HMI 10. For example, the operating system 228 may call the user interface thread 237 to render graphics on the touch screen 205 in response to a generated event 236, such as a touch event. In particular, the user interface thread 237 may be configured to execute a function in response to events with the stored user event handlers 226 through the operating system 228. For example, the user interface thread 237 may execute a screen navigation function associated with the coordinates of a touch screen event. The screen navigation function may then cooperate with the user event handlers 226 to select stored graphics 222 and visual component layouts 224 corresponding to the screen navigation function to render new graphics on the touch screen 205.

As another example, the operating system 228 may call the CDM communications thread 238 to initiate the communication of events to the CDM 16. The communications from the HMI 10 to the CDM 16 may be enabled by a CDM event handler in the input/output interface 235. As yet another example, the operating system 228 may call the NMS agent thread 239 to initiate backend communications between the HMI 10 and one or more backend (i.e., external) databases such as the databases 30 discussed above with respect to FIG. 1. In an embodiment, the NMS agent thread 239 may be configured to route instructions through the operating system 228, the controller 230 and the consumer engagement module 220 to the communication interface 22 (e.g., a modem). The communication interface 22 may then forward the instructions to the databases 30 over the network 25. For example, the NMS agent thread 239 may be utilized to send instructions for requesting updated graphics for customizing a user interface displayed on the touch screen 205.

The controller 230 in the HMI 10 may also be in communication with a consumer engagement module 220. In various embodiments, the consumer engagement module 220 may be configured to receive inputs (e.g., consumer commands) from the external devices 6 which may be in lieu of or in addition to consumer input received from the touch screen 205. Where the touch screen events relate to operations with the dispense module 20, the controller 230 may also be in communication with input/output interface 235 which functions as an event handler for the CDM 16. In particular, the input/output interface 235 may enable the communication of events (e.g., beverage pouring events) from the HMI 10 to the CDM 16 via corresponding input/output interface 250.

The CDM 16 may include a controller input/output board 240, a controller 245, an operating system 248, the input/output interface 250, a stored data model 252, a stored messaging model 254, stored monitoring data 256, stored recipe data 258, stored adapters 260, and an input/output interface 261. The controller input/output board 240 may be in communication with the controller 245, the operating system 248 and the communications bus 262. In some embodiments, the controller input/output board 240 may comprise a number of interfaces and ports for communicating various dispenser commands. The interfaces and ports may include, but are not limited to, controller area network (CAN) interfaces, serial ports (e.g., RS-232) and USB ports. It should be understood that the configuration of the controller input/output board 240 may be based on the type of dispenser being utilized (e.g., CAN interfaces for dispensers that communicate using CAN messages, RS-232 ports for dispensers utilizing serial communications and USB ports for dispensers utilizing USB communications). For example, in some dispenser configurations, the controller input/output board 240 may be operative to communicate to the RFID controller board 275 exclusively over a USB connection. In some embodiments, the controller input/output board 240 may include combinations of CAN interfaces, serial ports and/or USB ports. The controller input/output board 240 may further include one or more threads (i.e., CDM threads) for communicating various dispenser commands, instructions and messages between the controller boards 265-280, the node 285 and the controller 245 via the operating system 248. In embodiments, the controller input/output board 240 may perform client functions in the CDM 16.

The controller 245 may be in communication with the operating system 248, the input/output interface 250, the stored data model 252, the stored messaging model 254, the stored monitoring data 256, the stored recipe data 258, the stored adapters 260, and the input/output interface 261. In embodiments, the controller 245 may perform server functions in the CDM 16. The controller 245 may be configured to receive CDM event communications from the input output interface 235 in the HMI 10 via the input/output interface 250. The controller 245 may further communicate with the controller input/output board 240 or the input/output interface 261 (via the operating system 248) to send and receive control or command messages for performing various dispenser operations. In some dispenser configurations, the control or command messages may be executed by the controller boards 265-280 and/or the node 285 which are in communication with the controller input/output board 240 and the communications bus 262. In other dispenser configurations, the control or command messages may be executed via controller boards having a direct connection to the input/output interface 261. For example, in an embodiment, the RFID controller board 275 may optionally be connected (via USB) directly to the input/output interface 261. In some embodiments, the control or command messages may include, without limitation, monitoring a current dispenser status and dispenser events (which may be stored in the monitoring data 256), generating dispenser status messages or events, retrieving a beverage product recipe (e.g., from the stored recipe data 258) based on a received beverage identification, selecting a number of dispenser pumps based on ingredients in a previously retrieved beverage product recipe, starting and stopping dispenser pumps based on ratios of the ingredients in the retrieved beverage product recipe, and initiating agitation of various ingredients (e.g., ice, carbonation, etc.) associated with dispensing a beverage product.

The communications bus 262 connects the CDM 16 to the macro-ingredient controller board 265, micro-ingredient controller board 270, RFID controller board 275, other controller boards 280 and node 285. In some dispenser configurations, the macro and micro-ingredient controller boards 265 and 270 may not be utilized and may be replaced by an input/output module. As described in more detail below with respect to FIGS. 3-5, the ingredient controller boards 265, 270 or the input/output interface 261 may be utilized for pumping ingredients or otherwise controlling dispenser equipment to facilitate the dispensing of beverage products from the dispenser 200. The ingredient controller boards 265, 270 or the input/output interface 261 may also be utilized to carry out periodic agitation of ingredients utilized in the dispensing of a beverage from the dispenser 200. In an embodiment, the other controller boards 280 may comprise a controller board containing a door open sensor (not shown) which detects when a dispenser door has been opened and may further be configured to communicate a current dispenser door status to the CDM controller input/output board 240. In some embodiments, the RFID controller board 275 may be utilized for identifying beverage ingredient cartridges installed in the dispenser 200. The controller boards 265-280 may also facilitate the starting and stopping of dispenser agitation and/or pumping operations based on monitored events (e.g., the opening of a dispenser door, ingredient cartridge removal/insertion, ingredient sold out status, etc.). The node 285 may facilitate modular expansion of additional ingredient sources and associate pumps and controllers or other such additional dispenser hardware desired.

As briefly discussed above, the HMI 10 and the CDM 16 in the dispenser 200 may comprise a control architecture that may be utilized for performing dispenser interaction events. In some embodiments, the dispenser interaction events may be initiated from a consumer, customer, technician or administrator via a user interface on the dispenser 200. In some embodiments, the dispenser interaction events may be initiated via the external devices 6 (e.g., from mobile devices such as smartphones, tablets, laptop computers, etc.). In some embodiments, the dispenser interaction events may be initiated via remote external devices such as backend database servers (e.g., the databases 30) or other backend computing devices. The dispenser interaction events may include events which are handled independently by the HMI 10 or in conjunction with the CDM 16. In an embodiment (and as discussed above), the HMI 10 may independently handle screen navigation. For example, the HMI 10 may receive a request to navigate between display screens on the dispenser 200 via a screen navigation touch event. The user interface thread 237 may then process an event 236 (i.e., the screen navigation touch event) to reference and load the appropriate screen from the stored graphics 222 and the visual component layouts 224.

In another embodiment, the HMI 10 may handle dispenser control events (e.g., the pouring of a beverage, etc.) in conjunction with the CDM 16. For example, a request to dispense a selected beverage product on the touch screen 205 (or alternatively an external device 6) may be realized by the HMI 10 sending instructions to the CDM 16. The CDM 16 may then translate the instructions (via an adapter 260) to appropriate control messages for communication by the controller input/output board 240 (via the communications bus 262) to the appropriate hardware (i.e., the ingredient controller boards 265 and/or 270) which may be utilized for dispensing the selected beverage product. As another example, a consumer wishing to select a beverage product for dispense may interact with the touch screen 205 to request a menu of available beverages for selection. In response to the consumer interaction, the consumer input may be communicated to the HMI as an event 236 to touch screen driver 215 and subsequently communicated to operating system 228 (via controller 230) for processing by the user interface thread 237. The CDM communications thread application 238 may then be configured to send the event 236 (i.e., instructions) to the CDM 16 which, utilizing an adapter 260, may translate the instructions to predetermined commands (i.e., dispenser-specific control messages compatible with the type of dispenser and associated underlying equipment hardware being utilized) for performing requested operations received in the event 236. As another example, a request to display a menu that includes data or settings related to specific hardware in the dispenser 200 via the touch screen 205 (or alternatively an external device 6), may be realized by the HMI 10 sending instructions to the CDM 16 that may translate the instructions and communicate control messages and/or data back to the HMI 10 to retrieve stored graphics 222 and visual component layouts 224 (which are specific to a particular dispenser display) for output on the touch screen 205. As still another example, a request to control a dispenser lighting function (e.g., background lighting) on the touch screen 205 may be realized by the HMI 10 sending instructions to the CDM 16 that may translate the instructions (via an adapter 260) and communicate one or more command messages for controlling dispenser lighting.

As briefly discussed above, the HMI 10 and the CDM 16 in the dispenser 200 may comprise a control architecture that may also be utilized for performing dispenser operation events. In some embodiments, the dispenser operation events may include dispenser controller board sensor events (e.g., pump operation status, dispenser door open, etc.), dispenser monitored data (e.g., empty ingredients) and dispenser background processes (e.g., dispenser agitation). The dispenser operation events may include events which are handled independently by the CDM 16 (e.g., dispenser background processes) or in conjunction with the HMI 10. Dispenser operation events which may be handled by the CDM 16 in conjunction with the HMI 10 may include the updating of a dispenser display screen/graphics in response to a change in a dispenser operation status (e.g., the dispenser is out of one or more ingredients, the dispenser door is open, the dispenser is dispensing a beverage for a consumer, etc.).

Figure 3:
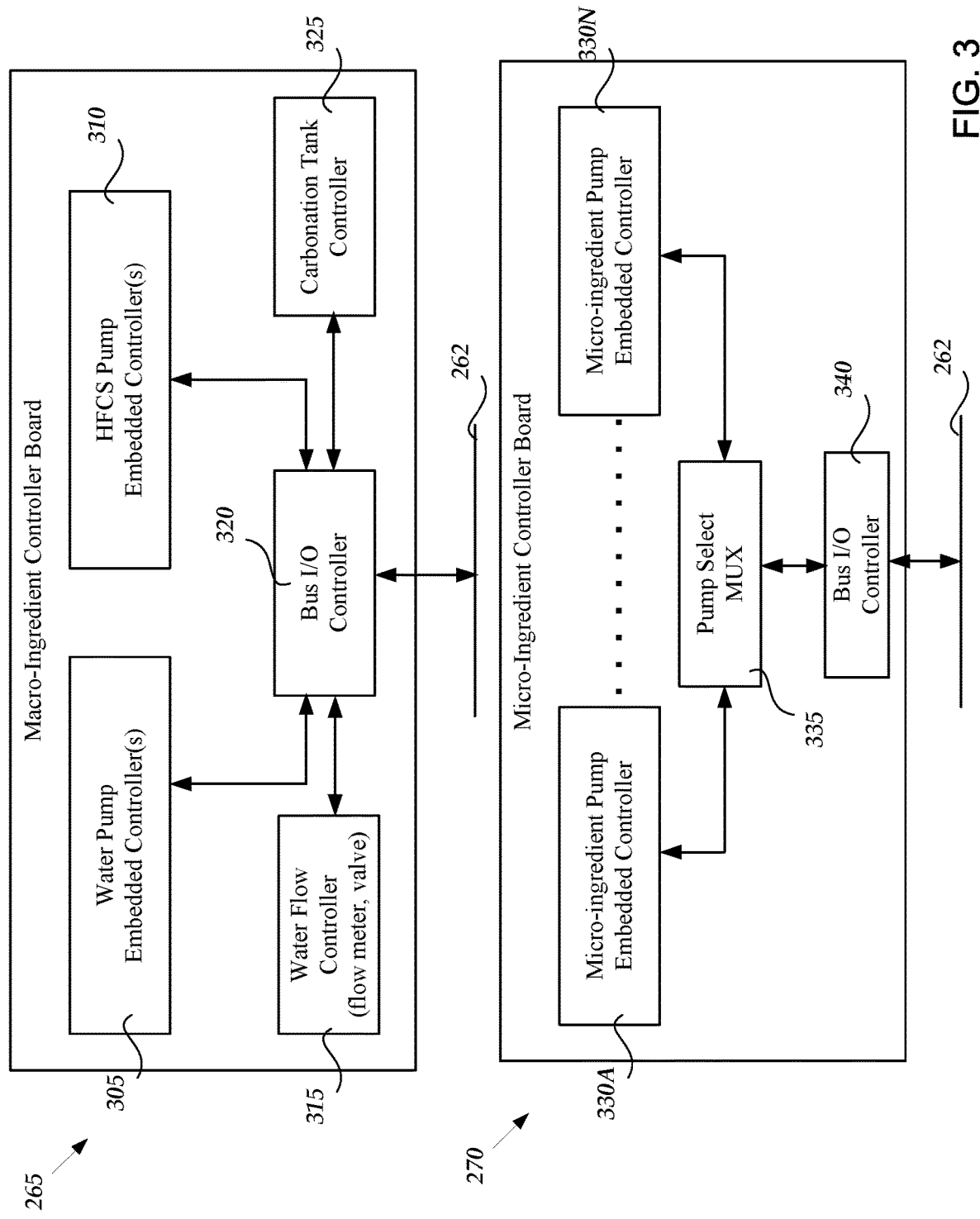
FIG. 3 is a block diagram illustrating controller boards in the dispenser of FIG. 2, in accordance with an embodiment.

FIG. 3 is a block diagram illustrating the macro-ingredient controller board 265 and the micro-ingredient controller board 270 in the dispenser 200 of FIG. 2, in accordance with an embodiment. The macro-ingredient controller board 265 may comprise or be in communication with various embedded controllers including one or more water pump embedded controllers 305, HFCS (High Fructose Corn Syrup) pump embedded controllers 310, a water flow controller 315 (which may include a flow meter and/or a valve) and a carbonation tank controller 325. The various embedded controllers may be utilized for the pumping of macro-ingredients (e.g., water, HFCS) utilized in forming a beverage product. Each of the controllers 305, 310, 315 and 325 may be in communication with bus input/output controller 320 that may communicate controller commands, instructions, or data with the CDM 16 via the communications bus 262.

The micro-ingredient controller board 270 may comprise or be in communication with a number of micro-ingredient pump embedded controllers 330A-330N that may be utilized for the pumping of micro-ingredients (e.g., acids, flavors, beverage brands) utilized in forming a beverage product. Each of the micro-ingredient pump embedded controllers 330A-330N may be in communication pump select multiplexer that may be utilized to select one or more micro-ingredient pumps utilized in the dispensing of a beverage product according to a predetermined recipe. The pump select multiplexer 335 may be in communication with bus input/output controller 340 that may communicate controller commands, instructions or data with the CDM 16 via the communications bus 262.

Figure 4:
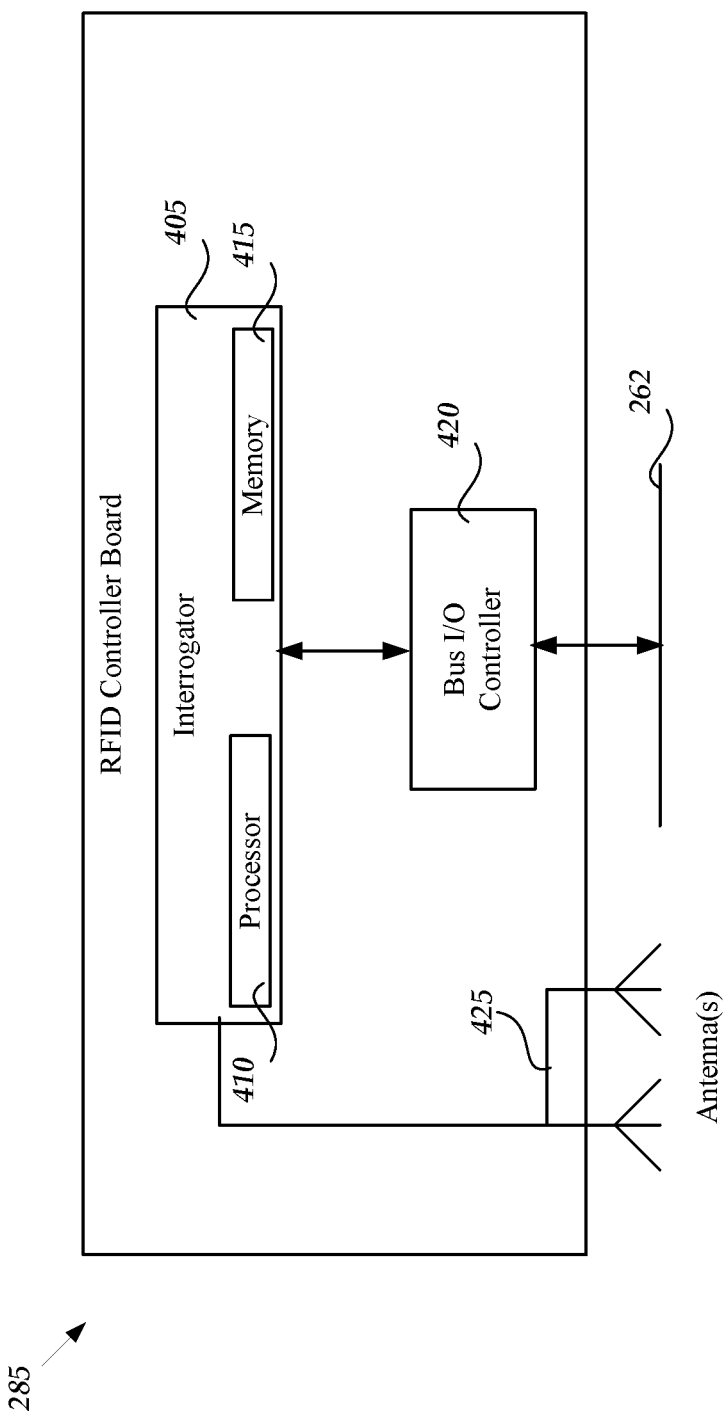
FIG. 4 is a block diagram illustrating a controller board in the dispenser of FIG. 2, in accordance with an embodiment.

FIG. 4 is a block diagram illustrating the RFID controller board 275 in the dispenser 200 of FIG. 2, in accordance with an embodiment. The RFID controller board 275 may comprise an interrogator 405 having a processor 410 and a memory 415. The interrogator 405, which may be in communication with one more antennas 425, may be utilized for various functions associated with the recognition of dispenser cartridges containing beverage product ingredients including, for example, identifying beverage product ingredients, determining fill levels associated with a beverage cartridge, and determining beverage product ingredient expiration dates. The interrogator 405 may also be in communication with bus input/output controller 420. In some embodiments, the input/output controller 420 may communicate controller commands, instructions or data with the CDM 16 via the communications bus 262. In other embodiments, the input/output controller 420 may communicate controller commands, instructions or data directly to the CDM 16 (i.e., to the input/output interface 261).

Figure 5:
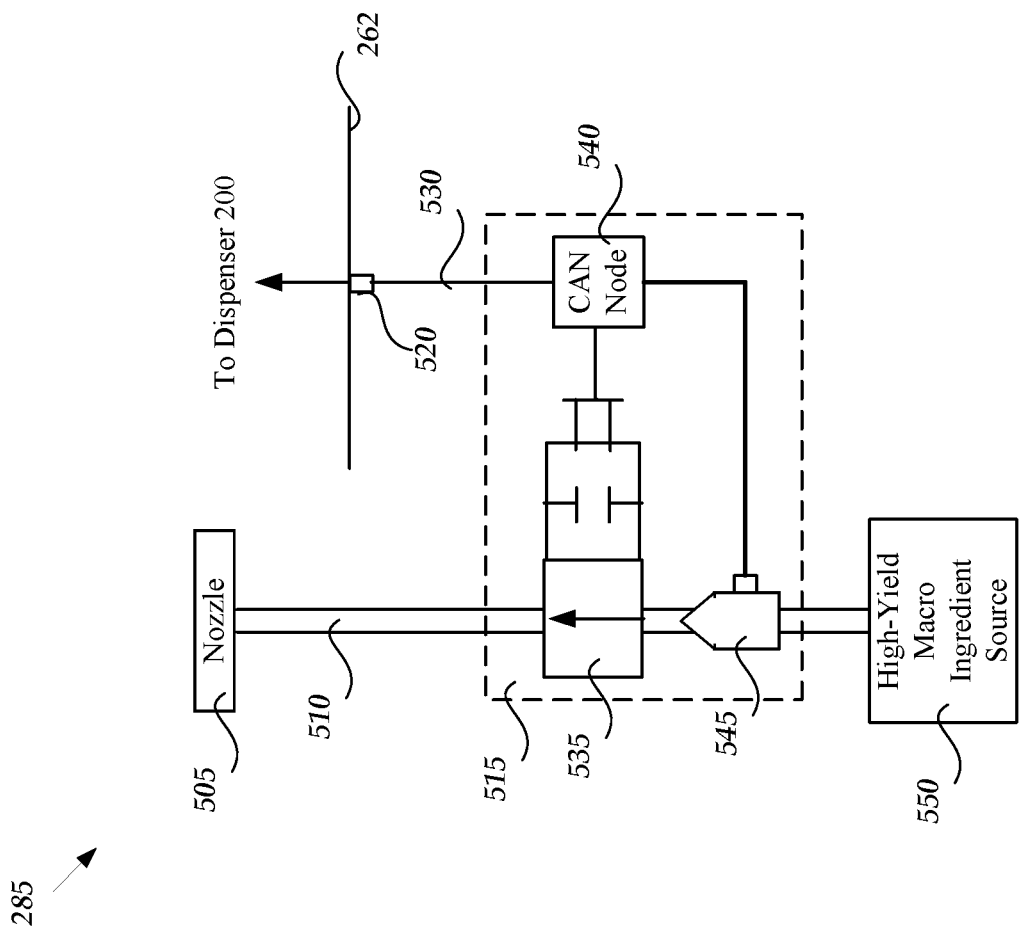
FIG. 5 is a block diagram illustrating a modular add-on component that may be enabled for use in the dispenser of FIG. 2 by the dispenser control architecture, in accordance with an embodiment.

FIG. 5 is a block diagram illustrating the node 285 in the dispenser 200 of FIG. 2, in accordance with an embodiment. The node 285 may comprise a modular device which may be added (e.g., retro-fitted) to the dispenser 200 utilizing the above-described dispenser control architecture. In an embodiment, the node 285 may be utilized for dispensing high-yield (e.g., 8:1 to 15:1 reconstitution ratio) macro-ingredients or alternative sweetener macro-ingredients such as sweetener blends. The node 285 may include a nozzle 505, tubing 510, a pumping module enclosure 515, a removable electrical connector 520 (for connecting the node 285 to the dispenser 200 via the communications bus 262), an electrical connection 530 and a high-yield macro-ingredient source 550 or other such additional desired beverage ingredient. In some embodiments, the nozzle 505 may already be present on the dispenser 200 and may not be included as part of the node 285.

The nozzle 505 may be in fluidic communication with the tubing 510 and utilized for dispensing the high-yield macro-ingredient source 550 which, in some embodiments, may comprise one or more ingredients having a reconstitution ratio of about 6:1 to about 10:1. In some embodiments, the high-yield macro-ingredient source 550 may have a reconstitution ratio of about 8:1 to about 15:1. The tubing 510 may also be in fluidic communication with the pumping module enclosure 515. The pumping module enclosure 515 may be in fluidic communication with the high-yield macro-ingredient source 550 and electrically connected to the removable connector 520 via electrical connection 530. In some embodiments, the tubing 510 and the electrical connection 530 may be bundled into a single electrical/fluidic harness connecting the nozzle 505, the pumping module enclosure 515, the removable connector 520 and the high-yield macro-ingredient source 550.

The pumping module enclosure 515 may include a solenoid valve 535, a CAN node 540 and a pumping/metering device 545. In an embodiment, the pumping module enclosure 515 may be located near the dispenser 200 (e.g., under a counter). In some embodiments, the high-yield macro-ingredient source 550 may comprise multiple macro-ingredient sources connected to a corresponding number of pumping/metering devices 545 and a corresponding number of CAN nodes 540 in the pumping module enclosure 515.

The pumping/metering device 545 (which may comprise a controlled gear pump) may be connected to the high-yield macro-ingredient source 550 and further be in fluid communication with the solenoid valve 535. The solenoid valve 535 may be utilized to prevent fluid from drooling at the nozzle 505. The pumping/metering device 545 may be controlled by the CAN node 540 which is removably connected to the dispenser 200 (via the removable connector 520 and the bus 262). Thus, the node 285 may be added to the dispenser 200 by utilizing the removable connector 520 to the CAN node 540. In an embodiment, the CAN node 540 may be connected to the controller input/output board 240 in the dispenser 200 (via the communications bus 262). The pumping/metering device 545, in communication with the CAN node 540, may turn the flow of macro-ingredients (from the high-yield macro-ingredient source 550) on an off in coordination with the flow of other ingredients and diluents at the nozzle 505 based on the recipe corresponding to the selected beverage. The macro-ingredients may then be air-mixed into the main stream from the nozzle. In an embodiment, the high-yield macro-ingredient source may comprise one or more bags-in-boxes (BIBs).

The controller input/output board 240 may be configured to recognize the node 285 via a software update to the adapters 260 stored in the CDM 16 of the dispenser 200. The addition of the node 285 may also comprise additional updates being made to backend databases (e.g., the databases 30) in communication with the dispenser 200 to utilize new beverage recipes and associated dispenser display screen graphics associated with the macro-ingredients pumped from the high-yield macro-ingredient source 550. For example, the images/icons 32 and the recipe data 36 in the databases 30 may be updated to reflect new beverage recipes and associated graphics which may be selected on the dispenser 200 via the touch screen 205. The recipe and graphics data may be accessed by the HMI 10 (e.g., utilizing the NMS agent thread 239). The HMI 10 may then utilize user interface thread 237 to communicate the new graphics to the touch screen 205 and/or the external devices 6. The HMI 10 may further utilize the CDM communications thread 238 to communicate the updated recipe data to the CDM 16 to facilitate the dispensing of beverages with one or more new ingredients.

Figure 6:
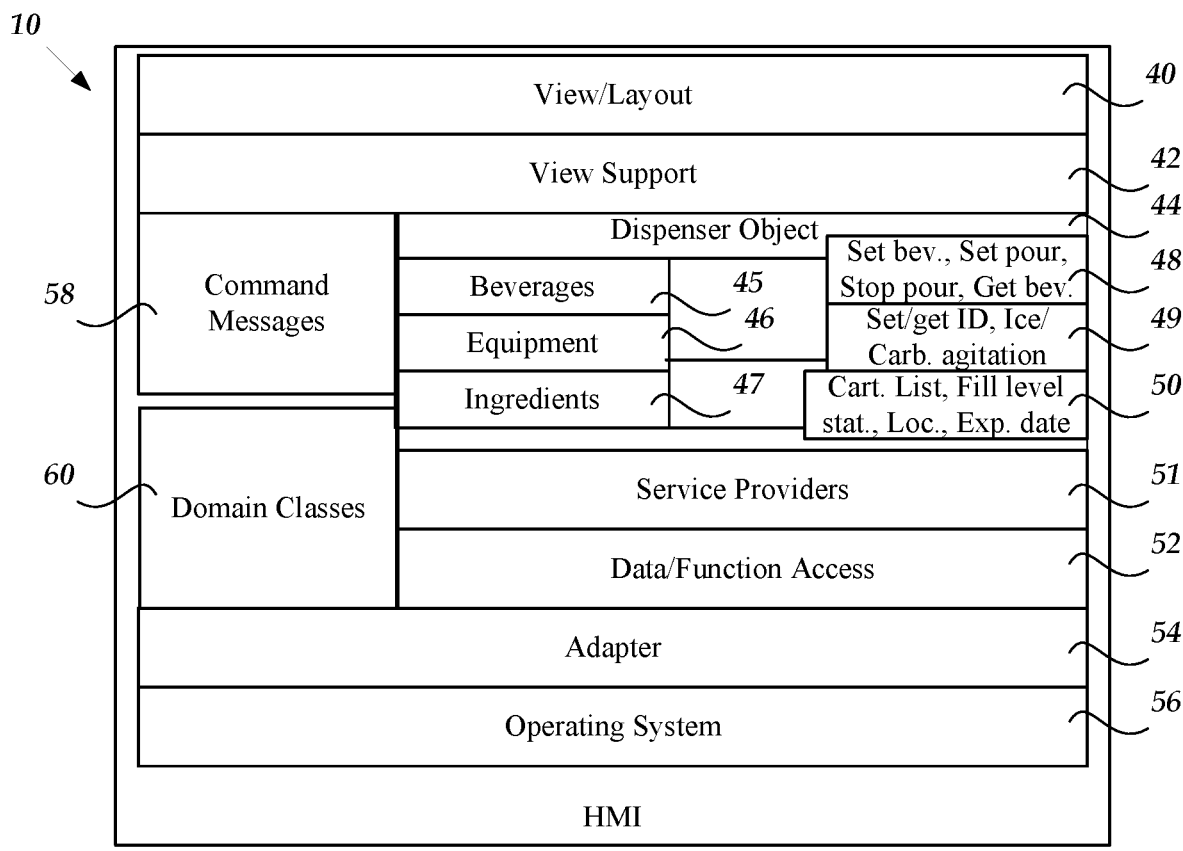
FIG. 6 is a block diagram illustrating human machine interface module layers in the dispenser control architecture of FIGS. 1 and 2, in accordance with an embodiment.

FIG. 6 is a block diagram illustrating various software layers of the HMI 10 in the dispenser control architecture of FIGS. 1 and 2, in accordance with an embodiment. The HMI 10 may include a view/layout layer 40, a view support layer 42, a command messages layer 44, a dispenser object layer 44, a service providers layer 51, a data/function access layer 52, an adapter layer 54, an operating system layer 56, a command messages layer 58 and a domain classes layer 60. The view/layout layer 40 may be utilized to describe display (e.g., touch screen layouts) and for connecting events to view support functions. The view/layout layer 40 may further define how a particular display screen comprising visual objects is drawn at a particular time (e.g., the drawing of buttons and the selection of a background color for a beverage product selection screen) and how responses to touch events that are made on visual objects are handled (e.g., which of various functions are called in response to various touch events being received on a dispenser touch screen). For example, a function for redrawing a display screen may be called in response to a navigation event and a function for dispensing a beverage may be called in response to a dispenser activation event.

The view support layer 42 may be utilized to receive function calls from the view/layout layer 40 and to call out specific methods in the dispenser object 44 based on the received function calls. The dispenser object layer 44 may include various sub-objects for executing methods associated with a received function call. For example, the dispenser object layer 44 may include a beverage sub-object 45 that may include methods for setting a beverage product, starting a beverage dispense (e.g., pour), stopping a beverage dispense (e.g., pour) and getting (i.e., returning) a list of beverage products available in a dispenser. The dispenser object layer 44 may also include an equipment sub-object 46 that may include methods for setting/retrieving a beverage product identification, starting and stopping dispenser pumps, and starting and stopping dispenser agitation operations (such as ice agitation and carbonation agitation). The dispenser object layer 44 may also include an ingredients sub-object 47 that may include methods for retrieving a list of beverage ingredient cartridges installed in a dispenser, determining a current fill level status for installed beverage ingredient cartridges, determining the location of various installed beverage ingredient cartridges and expiration dates associated with various installed beverage ingredient cartridges.

The service providers layer 51 may be utilized to expose service APIs to the dispenser object layer 44. The data/function access layers 52 may comprise data access objects and function access objects for use by persistent objects and calls to adapters. The adapter layer 54 may comprise a client library (e.g., configuration files) or API that is associated with an external service (e.g., a relational database management system (RDMBS), the MBUS 14, a file system, etc.).

In some embodiments, the operating system layer 56 may comprise software configured to expose the capabilities of hardware devices to the threads 237-239 in the dispenser 200 (see FIG. 2). In addition, the operating system layer 56 may provide features and functions for process control, memory management, file systems and data communication used by the threads 237-239.

In some embodiments, the command messages layer 58 may comprise discretely arranged data structures designed to carry information between certain software layers. It should be understood that the use of command messages may enable precise control of command dispatching, scheduling and execution where one software layer requires the services of another. The domain classes layer 60 may represent various entities involved in a domain (e.g., a dispenser, beverage products, beverage ingredient cartridges, etc.). It should be understood that in one embodiment, the various layers 44-60 may collectively comprise a core human machine interface while the view/layout and view support layers 40 and 42 may represent customizable features that may be implemented in a dispenser user interface. It should be understood that the various layers of the HMI 10 may be utilized with different user interface hardware (e.g., the external devices 6 shown in FIG. 2) in instances where all that needs to be updated are the view/layout layer 40 and the view support layer 42.

Figure 7:
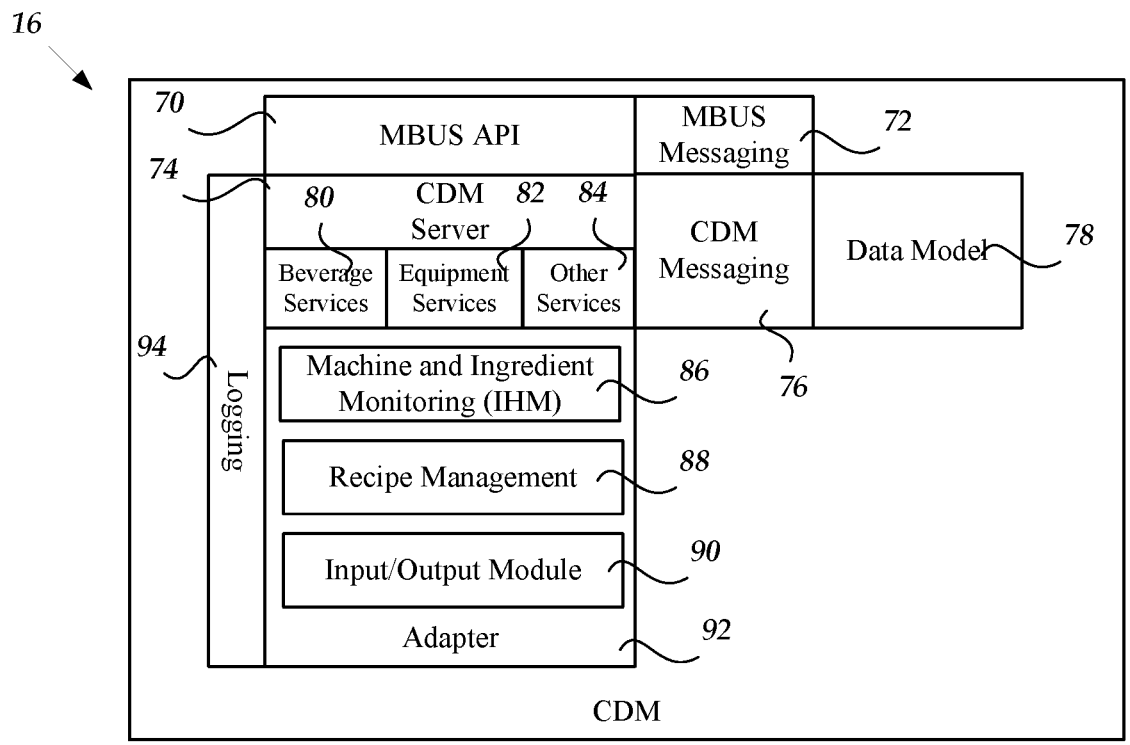
FIG. 7 is a block diagram illustrating the core dispense module layers in the dispenser control architecture of FIGS. 1 and 2, in accordance with an embodiment.

FIG. 7 is a block diagram illustrating various software layers of the CDM 16 in the dispenser control architecture of FIGS. 1 and 2, in accordance with an embodiment. The CDM 16 may include an MBUS API layer 70, an MBUS messaging layer 72, a CDM Server layer 74, a CDM messaging layer 76, a data model layer 78, an adapter layer 92 and a logging layer 94. The CDM server layer 74 may include a beverage services layer 80, an equipment services layer 82 and other services layer 84.

The adapter layer 92 may include a machine and ingredient monitoring (IHM) layer 86, a recipe management layer 88 and an input/output module layer 90. The IHM layer 86 may be utilized by the CDM 16 for performing a number of dispenser functions including, but not limited to monitoring the beverage ingredient cartridge fill levels, dispenser pump operation, beverage ingredient agitation, carbonator pressure, etc. In some dispenser configurations (e.g., dispensers which do not require ingredient agitation), the IHM layer 86 may be absent from the adapter layer 92.

The recipe management layer 88 may be utilized by the CDM 16 to match a beverage product recipe to a beverage product identification and other data received from the HMI 10. For example, in response to a "set beverage 345" command received from the HMI 10, the recipe management layer may be utilized to validate the received beverage identification against the stored recipe data 258 (see FIG. 2) and determine a corresponding beverage product recipe that may include predetermined ratios of various ingredients that need to be pumped from a dispenser to form the beverage product. For example, "beverage 345" may correspond to a carbonated cherry beverage that comprises 60% carbonated water, 30% HFCS and 10% cherry juice. The recipe management layer 88 may further be utilized by the CDM 16 to determine one or more pumps (e.g., combinations of macro-ingredient and/or micro-ingredient pumps) that may be utilized to dispense a beverage product corresponding to a particular recipe.

The input/output module layer 90 may be utilized to translate generic instructions received from the HMI 10 into specific command or control messages compatible with a particular dispenser. For example, for a dispenser having a CAN interface, the HMI input/output module layer 90 may communicate the appropriate dispensing instructions as CAN messages to the applicable pumps needed for dispensing a requested beverage product. It should be understood that the input/output module layer 90 may be configured for use with any number of dispenser communication protocols including CAN, universal serial bus (USB) and RS-232. It should be understood that while a number of different dispenser hardware may be utilized with the CDM 16, the only layer that needs to be updated is the adapter layer 92.

Figure 8:
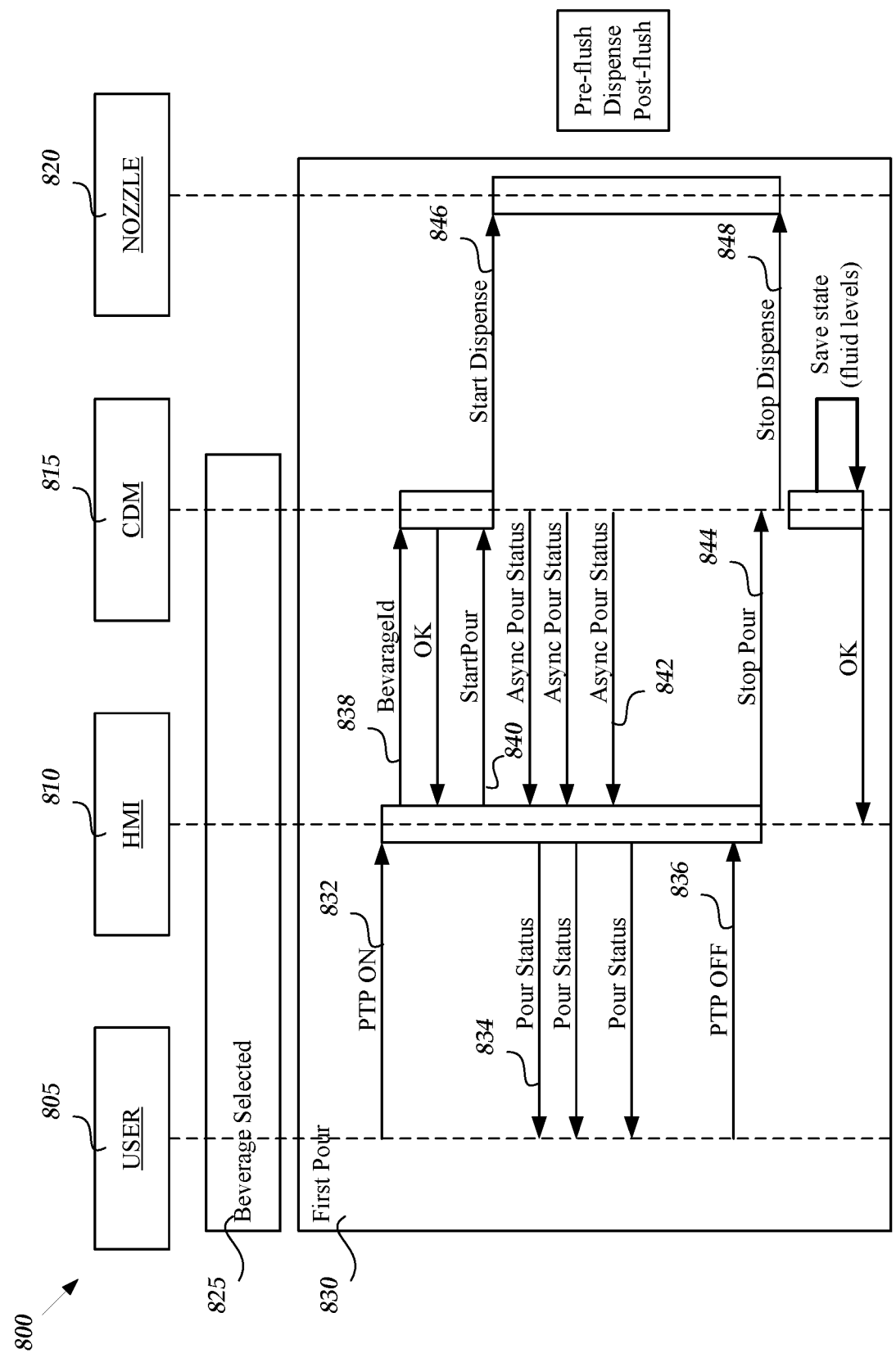
FIG. 8 is a diagram illustrating a flow for utilizing a dispenser control architecture for dispensing a beverage product, in accordance with an embodiment.

FIG. 8 is a diagram illustrating a flow 800 for utilizing a dispenser control architecture for dispensing a beverage product, in accordance with an embodiment. It should be understood that FIG. 8 is exemplary of a process flow for events originating at the HMI 10 and which also require communication and/or interaction with the CDM 16 for processing the events.

The flow 800 includes a user block 805 (i.e., user 805), an HMI block 810 (i.e., HMI 810), a CDM block 815 (i.e., CDM 815) and a nozzle block 820 (i.e., nozzle 820). It should be understood that the HMI 810 and the CDM 815 may correspond to the HMI 10 and the CDM 16, discussed above with respect to FIG. 2.

A beverage selection 825, made by the user 805, may be communicated to the CDM 815 via the HMI 810. The beverage selection 825 may be in the form of a touch event made by the user 805 to select a beverage product from a list of beverage products displayed on a dispenser touch screen. The HMI 810 may send the touch event to the CDM 815. For example, upon a beverage identification being received by the CDM 815, the beverage identification may be validated, a corresponding recipe may be looked up (e.g., retrieved via the recipe data 258) and the correct dispenser pumps may be identified and made ready to pump the beverage product ingredient according to the recipe (e.g., through control messages communicated to the respective ingredient controller board(s) 265, 270 via the controller input/output board 245).

A dispense request 830 may then be initiated by the user 805 to dispense the sleeved beverage. The dispense request 830 may comprise a push-to-pour (PTP ON) touch event 832 made on a dispenser touch screen or other use input hardware, by the user 805. The PTP ON touch event 832 may be received by the HMI 810 from which a beverage ID 838 may be retrieved and communicated to the CDM 815. The CDM 815 may validate the received beverage ID 838 by utilizing the recipe management layer 88 of the adapter layer 92 (shown in FIG. 6) to match the beverage ID 838 to a list of recipes stored in the dispenser in order to identify the selected beverage product to be dispensed. In some embodiments, the recipe may already have been loaded and the corresponding pumps readied to dispense the beverage product based on an earlier beverage selection event.

The CDM 815 may then receive a start pour instruction 840 from the HMI 810 and utilize the IHM layer 86 of the adapter layer 92 (shown in FIG. 6) to determine the appropriate pump or pumps (based on the type of dispenser) for dispensing the beverage product ingredients and/or generate corresponding command and control messages (i.e., start dispense message 846) to initiate the dispense of the beverage product from the nozzle 820. The CDM 815 may also generate and send pour status messages 842 to the HMI 810 that may be communicated to the user 805 as pour status messages 834 displayed on a dispenser screen. Once the selected beverage product has been dispensed from the nozzle 820, the user 805 may stop the dispensing operation (e.g., by releasing a PTP button displayed on dispenser user interface) that may result in the generation of a push-to-pour (PTP OFF) touch event 836 that is received by the HMI 810 and communicated to the CDM 815 as a stop pour message 844. The CDM 815 may then translate the stop pour message 844 (using the aforementioned dispenser adapter) into a stop dispense control message 848. The CDM 815 may also be configured to save a current dispenser fluid level state following dispense of a beverage product. It should be understood that the flow 800 may be utilized for dispenser pre-flush and post-flush operations in addition to, or in lieu of, the dispensing of beverage products.

Figure 9:
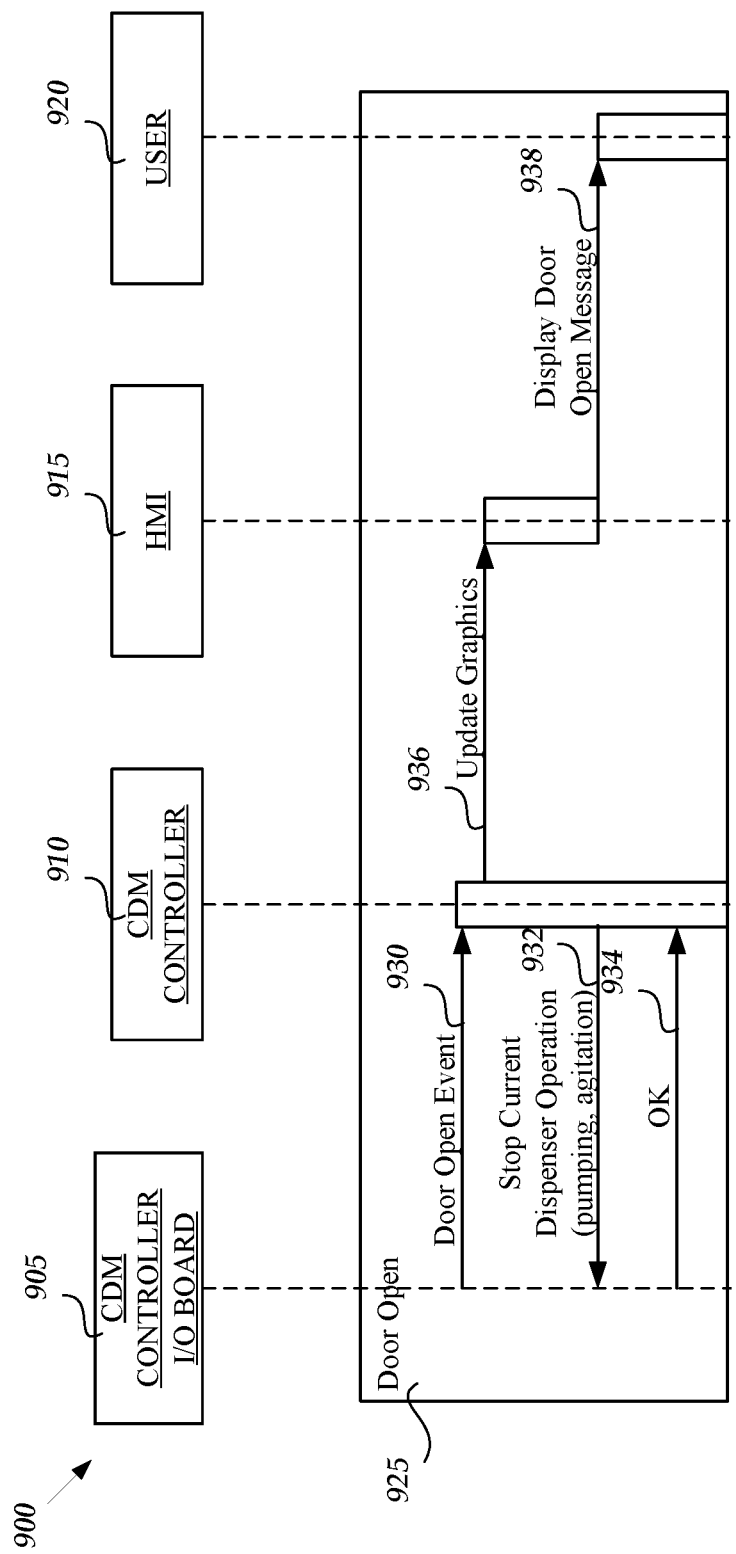
FIG. 9 is a diagram illustrating a flow for utilizing a dispenser control architecture to perform dispenser operations in response to a monitored event, in accordance with an embodiment.

FIG. 9 is a diagram illustrating a flow 900 for utilizing a dispenser control architecture to perform dispenser operations in response to a monitored event, in accordance with an embodiment. It should be understood that FIG. 9 is exemplary of a process flow for events originating at the CDM 16 that cause updates to be made at the HMI 10. Moreover, those skilled in the art will recognize that similar process flows are readily apparent for other events that originate at the CDM 16 (e.g., ingredient sold-out events, etc.).

The flow 900 includes a CDM controller input/output board block 905 (i.e., CDM controller input/output board 905), a CDM controller block 910 (i.e., CDM controller 910), an HMI block 915 (i.e., HMI 915) and a user block 920 (i.e., user 920). It should be understood that the CDM controller input/output board 905, the CDM controller 910 and the HMI 915 may correspond to the controller input/output board 240, the controller 245 and the HMI 10, discussed above with respect to FIG. 2.

Upon the detection of a "dispenser door open" condition 925 by the CDM controller input/output board 905 (e.g., by receiving a CAN message from a dispenser controller board containing a door sensor), the CDM controller input/output board 905 may generate a "door open" event 930 and communicate the event 930 to the CDM controller 910. In an embodiment, the "dispenser door open" condition 925 may occur in response to the opening of a dispenser door by a customer or consumer to perform a beverage ingredient cartridge change-out (e.g., in response to a sold-out/empty status message) or other dispenser maintenance task.

The CDM controller 910, upon receiving the door open event 930 from the CDM controller input/output board 905, may generate and send a "stop current dispenser operation" instruction 932 to the CDM controller input/output board 905. For example, the instruction 932 may contain one or more instructions to stop a current dispenser pumping and/or dispenser ingredient agitation operation. The CDM controller input/output board 905, upon receiving the instruction 932, may then translate instruction 932 and communicate with the appropriate controller boards to stop a current dispenser operation. For example, the CDM controller input/output board 905 may send a request to the macro-ingredient controller board 265 or the micro-ingredient controller board 270, to stop the pumping of ingredients via pump controllers 305, 310 and 330A-330N.

In response to sending the event 932 to the CDM controller input/output board 905, the CDM controller board 910 may receive an acknowledgement message 934 that the requested "stop current dispenser operation" has been communicated to the appropriate controller boards. The CDM controller 910 may also generate and send an "update graphics" event 936 to the HMI 915 for the purpose of updating a dispenser display with the current dispenser status. In an embodiment, the event 936 may be communicated from the CDM controller to an HMI controller (e.g., the HMI controller 230 of FIG. 2) via respective CDM and HMI input/output interfaces (e.g., the input/output interfaces 235 and 250 of FIG. 2).

Upon receiving the event 936 from the CDM controller 910, the HMI 915 may then retrieve a corresponding graphic to send to a dispenser display screen. For example, an operating system in the HMI 915 may retrieve a stored graphic indicating that the dispenser display door is currently open. The operating system may then call a user interface thread in the HMI 915 which provides instructions to send the graphic (i.e., "display door open" message 938) to a dispenser touch screen for viewing by the user 920.

Figure 10:
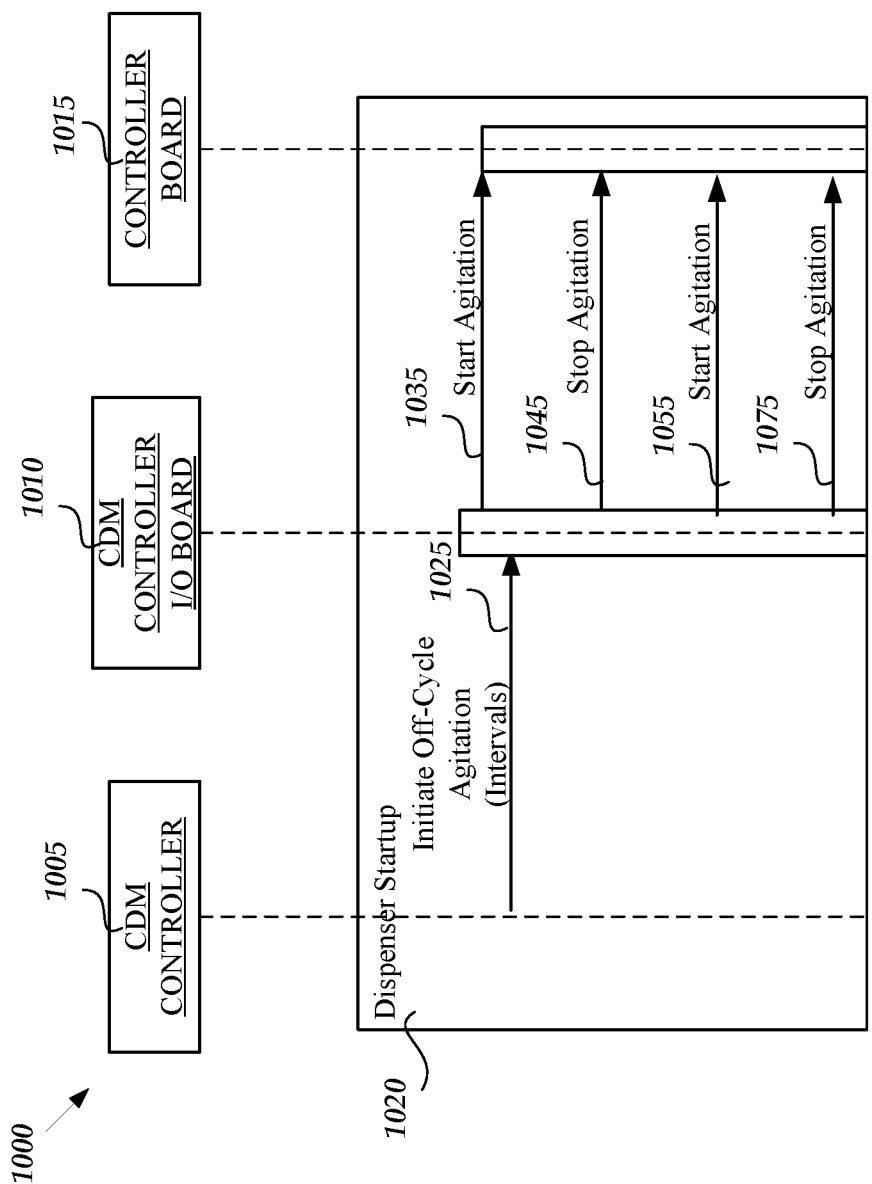
FIG. 10 is a diagram illustrating a flow for utilizing a dispenser control architecture to perform an automated dispenser off-cycle agitation process, in accordance with an embodiment.

FIG. 10 is a diagram illustrating a flow 1000 for utilizing a dispenser control architecture to perform an automated dispenser off-cycle agitation process, in accordance with an embodiment. It should be understood that FIG. 10 is exemplary of a process flow for events that originate at the CDM 16 and are processed independently at the CDM 16. Moreover, those skilled in the art will recognize that similar process flows are readily apparent for other events that are independently processed by the CDM 16 (e.g., events based on hardware operating conditions that do not require graphics updates utilizing the HMI 10).

An off-cycle agitation process may be utilized by the dispenser 200 to periodically agitate beverage ingredients stored therein. The flow 1000 includes a CDM controller block 1005 (i.e., CDM controller 1005), a CDM controller input/output board block 1010 (i.e., CDM controller input/output board 1010) and a controller board block 1015 (i.e., controller board 1015). It should be understood that the CDM controller 1005, the CDM controller input/output board 1010 and the controller board 1015 may correspond to the controller 245, the controller input/output board 240, and one or more of the other controller boards 280, discussed above with respect to FIG. 2.

Upon a dispenser startup, the CDM controller 1005 may communicate an "initiate off-cycle agitation" command 1025 to the CDM controller input/output board 1010. The command 1025 may be received by the CDM controller input/output board 1010 and translated into instructions which are compatible with the controller board 1015. For example, the CDM controller input/output board 1010 may execute one or more application threads to utilize the IHM layer 86 of the adapter layer 92 (shown in FIG. 6) to determine the appropriate instructions to send to the controller board 1015 responsible for dispenser ingredient agitation operations.

The CDM controller input/output board 1010 may then communicate a series of start and stop agitation commands 1035-1075 to the controller board 1015 over a predetermined interval to initiate the off-cycle agitation process. In some embodiments, the controller board 1015 may be pre-configured to perform a periodic agitation process. Thus, in these embodiments, only a single command from the CDM controller input/output board 1010 may be required to initiate the off-cycle agitation process.

A dispenser control architecture has been described above with examples of independent HMI processes, independent CDM processes, HMI interactions and/or events driving CDM functionality, and CDM interactions and/or events driving HMI functionality. It should be appreciated that CDM to HMI interactions, in addition to those described above, may also be possible. For example, upon beverage product ingredients being removed from the dispenser 200 of FIG. 2, the dispenser hardware may detect a change in configuration event. That is, the RFID controller board 275 may communicate an inventory event via the bus input/output controller 420 and processed by the CDM 16. The CDM 16 may provide status updates or command messages to the HMI 10 via input/output interfaces 250 and 235 to modify the functionality of the HMI 10. For example, a product list at the HMI 10 may be updated to remove products that require the aforementioned beverage product ingredients that were removed from the dispenser 200. The CDM 16 may identify which products to remove based on referencing the recipe management layer 88 of the adapter layer 92. In response, the HMI 10 may update which graphics are displayed on the touch screen 205 and/or load new screens to assist an end user in replacing the beverage ingredient that was removed. Other CDM driven events may also be contemplated, such as events based on hardware failures, time-out periods, or any other hardware triggered events. It should also be appreciated that the CDM may also be utilized to handle recurring background processes in the dispenser 200. For example, a recurring background process may include a maintenance function such as periodic ice agitation in the dispenser 200.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The system memory 1004 is an example of computer storage media (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the dispenser 200. Any such computer storage media may also be part of the dispenser 200. Computer storage media does not include a carrier wave or other propagated or modulated data signal.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Various embodiments are described above with reference to block diagrams and/or operational illustrations of methods, systems, and computer program products. The operations/acts noted in the blocks may be skipped or occur out of the order as shown in any flow diagram. For example, two or more blocks shown in succession may in fact be executed substantially concurrently or the blocks may sometimes be executed in the reverse order, depending upon the functionality/acts involved.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A beverage dispenser control architecture, comprising:
   an interface module for receiving instructions from a user for performing one or more requested dispenser operations; and
   a core dispense module including at least one adapter, wherein the core dispense module is capable of being used across a number of beverage dispenser types through the at least one adapter, wherein the at least one adapter is associated with at least one type of beverage dispenser and operable to translate the instructions into dispenser-specific control messages compatible with the at least one type of beverage dispenser for performing the one or more requested dispenser operations.

2. The beverage dispenser control architecture of claim 1, wherein the interface module is configured to receive the instructions from a touch screen.

3. The beverage dispenser control architecture of claim 1, wherein the interface module is configured to receive the instructions from a mobile computing device.

4. The beverage dispenser control architecture of claim 1, wherein the adapter is configured to translate the instructions into dispenser-specific control messages for dispensing a beverage product.

5. The beverage dispenser control architecture of claim 1, wherein the adapter is configured to translate the instructions into dispenser-specific control messages comprising one or more of:
   control messages for monitoring a beverage dispenser status;
   control messages for generating dispenser status messages;
   control messages for retrieving a beverage product recipe based on a received beverage identification;
   control messages for selecting a plurality of dispenser pumps for dispensing the requested beverage product based on ingredient ratios in the retrieved beverage product recipe;
   control messages for starting one or more dispenser pumps for dispensing the beverage product;
   control messages for stopping the one or more dispenser pumps for dispensing the beverage product;
   control messages for initiating agitation of one or more ingredients associated with dispensing the beverage product.

6. The beverage dispenser control architecture of claim 1, wherein the adapter is configured to translate the instructions into dispenser-specific control messages for displaying a user interface for selecting a beverage product.

7. The beverage dispenser control architecture of claim 1, wherein the adapter is configured to translate the instructions into dispenser-specific control messages for controlling a dispenser lighting function.

8. A beverage dispenser, comprising:
   an interface module for receiving instructions for performing one or more requested dispenser operations from a user; and
   a core dispense module in communication with the interface module, the core dispense module including at least one adapter, wherein the core dispense module is capable of being used across a number of beverage dispenser types through the at least one adapter, wherein the at least one adapter is associated with a type of the beverage dispenser and is operable to translate the instructions into dispenser-specific control messages compatible with the type of the beverage dispenser for performing the one or more requested dispenser operations.

9. The beverage dispenser of claim 8, wherein the interface module is configured to receive the instructions in response to a touch screen event generated by the user.

10. The beverage dispenser of claim 8, wherein the interface module is configured to receive the instructions from a mobile computing device.

11. The beverage dispenser of claim 8, wherein the at least one adapter is operable to translate the instructions into dispenser-specific control messages for dispensing a beverage product.

12. The beverage dispenser of claim 8, wherein the at least one adapter is configured to translate the instructions into dispenser-specific control messages comprising one or more of:

control messages for monitoring a beverage dispenser status;

control messages for generating dispenser status messages;

control messages for retrieving a beverage product recipe based on a received beverage identification;

control messages for selecting a plurality of dispenser pumps for dispensing the requested beverage product based on ingredient ratios in the retrieved beverage product recipe;

control messages for starting one or more dispenser pumps for dispensing the beverage product;

control messages for stopping the one or more dispenser pumps for dispensing the beverage product;

control messages for initiating agitation of one or more ingredients associated with dispensing the beverage product.

13. The beverage dispenser of claim 8, wherein the at least one adapter is operable to translate the instructions into dispenser-specific control messages for displaying a user interface for selecting a beverage product.

14. The beverage dispenser of claim 8, wherein the at least one adapter is operable to translate the instructions into dispenser-specific control messages for controlling a dispenser lighting function.

15. The beverage dispenser of claim 8, wherein the beverage dispenser is a large beverage dispenser for use in a large commercial or industrial setting.

16. A computer-readable storage medium storing computer executable instructions which, when executed by a beverage dispenser, will cause the beverage dispenser to perform actions comprising:

accessing instructions for performing one or more requested dispenser operations at a dispense module configured for use with a plurality of beverage dispenser types;

translating the instructions to predetermined commands associated with a type of the beverage dispenser at an associated adapter in the dispense module; and directing the beverage dispenser to perform the one or more requested dispenser operations based on the predetermined commands.

17. The computer-readable storage medium of claim 16, further comprising computer executable instructions which, when executed by the beverage dispenser, will cause the beverage dispenser to perform actions comprising:

receiving the instructions at an interface module.

18. The computer-readable storage medium of claim 16, further comprising computer executable instructions which, when executed by the beverage dispenser, will cause the beverage dispenser to perform actions comprising:

receiving the instructions at an interface module in response to a touch screen event resulting from user interaction with the beverage dispenser.

19. The computer-readable storage medium of claim 16, further comprising computer executable instructions which, when executed by the beverage dispenser, will cause the beverage dispenser to perform actions comprising:

receiving the instructions at an interface module from a mobile computing device.

20. The computer-readable storage medium of claim 16, further comprising computer executable instructions which, when executed by the beverage dispenser, will cause the beverage dispenser to perform actions comprising:

directing the beverage dispenser to perform the one or more requested dispenser operations based on the predetermined commands by generating one or more command messages for dispensing a beverage product.

\* \* \* \* \*